United States Patent [19]

Knapp

[11] 4,027,318
[45] May 31, 1977

[54] STABILIZING FOOT APPARATUS FOR CAMERA

[76] Inventor: Paul A. Knapp, 1303 W. 9th St., Tempe, Ariz. 85282

[22] Filed: Sept. 15, 1975

[21] Appl. No.: 613,450

[52] U.S. Cl. .................................. 354/293; 352/243
[51] Int. Cl.² .......................................... G03B 17/56
[58] Field of Search ............... 354/80, 81, 82, 293, 354/294; 352/243; 108/92, 93, 102

[56] References Cited

UNITED STATES PATENTS

| | | | |
|---|---|---|---|
| 2,483,711 | 10/1949 | Roos | 354/293 |
| 2,776,102 | 1/1957 | Schlafly | 354/293 X |
| 2,791,950 | 5/1957 | Oppenheimer | 354/294 |
| 2,891,458 | 6/1959 | Grimal | 352/243 |
| 3,055,283 | 9/1962 | Suzuki | 354/293 |
| 3,101,035 | 8/1963 | Williams | 354/293 |
| 3,511,159 | 5/1970 | Hobbs | 354/293 |

FOREIGN PATENTS OR APPLICATIONS 728,964   4/1955   United Kingdom ............... 354/293

*Primary Examiner*—L. T. Hix
*Assistant Examiner*—Alan Mathews
*Attorney, Agent, or Firm*—H. Gordon Shields

[57] ABSTRACT

Camera foot apparatus is disclosed which attaches on to the bottom of a camera to stabilize the camera by providing an area beneath the lens of the camera on which the camera is disposed.

5 Claims, 5 Drawing Figures

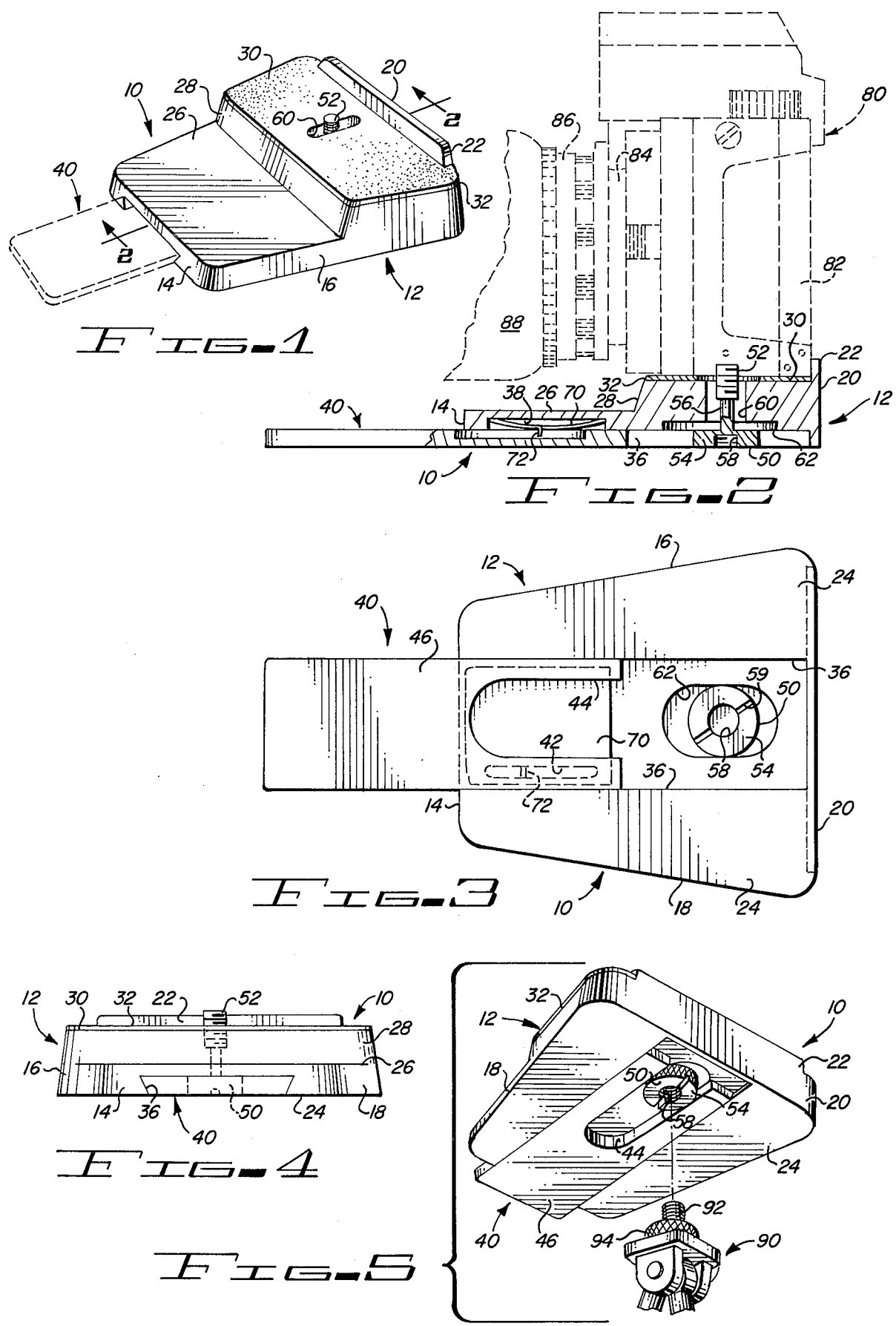

STABILIZING FOOT APPARATUS FOR CAMERA

BACKGROUND OF THE INVENTION

1. Field of the Invention

This invention relates to camera apparatus and, more particularly, to apparatus for supporting a camera to prevent the camera from tipping onto or resting on its lens attachment.

2. Description of the Prior Art

A primary concern in the field of photography is that of providing a stable platform for various photographic purposes, such as for projectors and for cameras under certain circumstances. The stable platforms generally are secured to the photographic equipment, whether it be a projector or a camera, and are generally adjustable. The orientation of the photographic equipment may require adjustment and there accordingly must be some type of adjustment mechanism associated with the platform.

A favorite type of platform or other stabilizing apparatus is a relatively simple tripod or three point platform. Since three points define a plane, a three point suspension is satisfactory for most purposes. Moreover, if two of the suspension points are aligned similar to the base of a triangle, and a third suspension point is forward of the other two suspension points, such as with respect to the apex of a triangle, the third point may be made adjustable in order to provide the necessary vertical adjustment in the orientation of the apparatus. These types of suspension and platform arrangements are well known in the art.

Another type of platform or stabilizing apparatus is also desired for contemporary cameras when the cameras are used with various types of accessory lens apparatus. Such accessory lens apparatus may be, and usually is, heavier than the camera and is generally cantilevered outwardly from the camera housing. Some lens barrel attachments are dimensioned so as to have a portion extend below the plane of the bottom of the camera housing. Accordingly, when a camera is placed on a generally flat surface, the camera must of necessity rest on the lens barrel or apparatus. This creates several potential problems, such as scratching or denting the lens barrel and/or camera, placing a strain on the attachment points between the camera and the lens, and even possibly scratching the surface, i.e. wood, on which the camera is placed.

The apparatus of the present invention, as attached to the bottom of a camera housing, provides sufficient area to stabilize the camera and to elevate the lens barrel off the surface on which the apparatus is placed to overcome the problems inherent with the use of accesssory lens assemblies with camera apparatus.

SUMMARY OF THE INVENTION

The apparatus disclosed and claimed herein comprises a stabilizing platform or foot secured to the bottom of a camera and extending forwardly with respect to the camera housing and beneath lens apparatus attached to the camera to support the camera and to prevent the lens apparatus from contacting the surface on which the camera apparatus is placed.

Among the objects of the present invention are the following:

To provide new and useful apparatus for a camera;

To provide new and useful stabilizing foot apparatus for a camera;

To provide a new and useful support apparatus for supporting a camera;

To provide new and useful apparatus for supporting a camera having a large lens attached to the camera;

To provide telescoping support apparatus for a camera; and

To provide new and useful support apparatus for a camera that allows adjustment of the lens apparatus of the camera.

BRIEF DESCRIPTION OF THE DRAWING

FIG. 1 is a perspective view of camera stabilizing foot apparatus of the present invention.

FIG. 2 is a view of the apparatus of FIG. 1 taken generally along 2—2 of FIG. 1, and showing a portion of a camera disposed on and secured to the camera foot apparatus.

FIG. 3 is a bottom view of the apparatus of FIGS. 1 and 2.

FIG. 4 is a front view of camera foot apparatus of the present invention.

FIG. 5 is a bottom perspective view of the apparatus illustrating how the camera foot apparatus may be secured to a camera tripod.

DESCRIPTION OF THE PREFERRED EMBODIMENT

FIG. 1 is a perspective view of stabilizing camera foot apparatus 10 of the present invention. The apparatus 10 includes a base 12 and an extension or tongue 40 movably secured to and within the base 12.

Since weight is not of direct relevance to the apparatus, except that a heavy base will add substantial weight to the camera itself, and thus will be somewhat of an inconvenience to the user, the apparatus may be made of any appropriate material, such as wood, plastic, or of a light metal, such as aluminum, or an alloy. Moreover, tolerances are not critical except that the extension 40 should slide freely in and out of the base 12, but there should not be a loose and sloppy fit between the base and the extension.

The base 12 is generally of trapezoidal configuration, including a front portion 14 which is generally parallel to a back or rear portion 20 (see FIG. 2), with the front 14 being dimensioned less in width than that of the back 20. A pair of sides 16 and 18 (see FIGS. 3 and 4) extend between the front and the back. Since the apparatus is of a trapezoidal configuration, the sides 16 and 18 are not parallel, but rather they extend outwardly from the front 14 to the back 20.

The upper or top portion of the base 12 includes a lower platform 26 and an upper platform 30 joined by a relatively short intermediate wall 28. The lower platform 26 extends rearwardly from the front 14 and the upper platform 30 extends forwardly from the back 20. The upper and lower platforms divide the base 12 about in half, with respect to the distance between the front and the back of the stabilizing foot apparatus 10. Generally, because of the trapezoidal configuration of the base, the width of the upper platform is greater than the width of the lower platform. The back 20 includes a stop portion 22 which extends upwardly with respect to the upper platform 30, and is remotely located with respect to the lower platform. The stop 22 accordingly comprises a short wall against which a camera is or may be disposed when the apparatus is secured to a camera.

On the top of the upper platform 30 is a layer of cushion material 32 on which the camera is disposed. A slot 60 extends through the cushion material 32 and through the upper platform 30 of the base 12. Extending through the slot, which is elongated from front to back, is a threaded shank 52 of a bolt 50 (see FIG. 2).

The extension or tongue 40 is shown extended outwardly from the front 14 of the base 12. The height or thickness of the extension 40 is less than the height or thickness of the lower platform 26 of the base 12, and the width of the extendion is less than the width of the lower platform at the front 14.

FIG. 2 is a sectional view of the apparatus of FIG. 1 taken generally along line 2—2 of FIG. 1, with a camera 80 illustrated as secured to the stabilizing camera foot apparatus 10. The camera 80 is shown disposed on the cushion material 32 on the upper platform and against the stop 22 of the back 20. The camera 80 is in turn secured to the stabilizing foot apparatus by means of bolt 50 which extends through the slot 60 in the base 12. The threaded shank 52 of the bolt 50 extends upwardly through the slot and is received by a tapped or threaded aperture of housing 82 of the camera 80.

As illustrated in FIG. 2, the camera housing 82 of the camera 80 is disposed on the cushion material 32 and against the stop 22. A portion of the camera housing extends forwardly of the upper platform 30 and accordingly overlies a portion of the lower platform 26. The intermediate wall 28 extends in a sloping manner between the lower and upper platforms. Secured to the front portion of the camera housing 82 is a lens mounting block 84. An aperture ring 86 secured to a lens barrel 88 in turn extends forwardly of the lens mounting block 84. The bottom portion of the lens barrel 88 extends below the top of the upper platform 26. Accordingly, the dimension or distance between the top of the cushion material 32 on the upper platform 30 and the lower platform 26 is, and of course must be, sufficient to allow for the lens barrel without interfering with the securing of the camera 80 to the apparatus 10. The illustration in FIG. 2 with respect to the dimensions of the lens barrel and the camera is typical with many different fixed lens barrels. That is, the lens barrels of many cameras extend below the bottom of the camera housing. For this reason, it is necessary to have a difference in height between the lower platform 26 and the upper platform 30.

The slot 60 is elongated lengthwise, or with respect to the front 14 and the back 20 of the foot apparatus to allow the apparatus to be used with a wide variety of cameras. Since the dimensions of different makes of cameras are not standard, it is necessary to accommodate a wide variety of cameras by using an elongated slot. Fortunately, the thread size of the threaded or tapped apertures on the bottom portion of the cameras is standard. Such threaded or tapped aperture on the bottom of camera housings is an attachment point for securing a camera to a tripod. Instead of a tripod, the foot apparatus of the present invention is secured to the camera by means of the aperture.

The bolt 50 includes, in addition to the threaded shank 52, a head 54 and a reduced neck 56 which extends between the head 54 and the threaded shank 52. A threaded aperture 58 is disposed centrally within the head 54 of the bolt to receive a threaded shank of the tripod, thus allowing the camera with the foot apparatus attached thereto to be secured to a tripod without having to remove the foot apparatus. The tapped or threaded aperture 58 is the same size as the tapped or threaded aperture in the camera 80 into which the threaded shank portion 52 of the bolt 50 extends. In this manner, the camera with the camera foot apparatus fastened thereto may be secured to a tripod, as illustrated below in FIG. 5.

The extension 40 is shown in FIG. 2 disposed in an outer position to help stabilize the camera. Obviously, depending on the length of the lens barrel 88, the extension 40 may be positioned in a variety of locations with respect to the base 12. On some cameras, it may not be necessary to move the extension outwardly from the base, but rather the extension may simply be retained within the base. On the other hand, if the lens barrel is relatively long, it may be necessary to extend the extension 40 outwardly from the base 12. The extension 40 is housed in a groove 36 at the lower portion of the base 12. Disposed within the groove 36 and within the base 12 is a recess 38 which receives a spring 70. The spring 70 is preferably the leaf spring which includes a locking tab 72 extending downwardly and into a slot 42 in the extension 40. The leaf spring 70 biases against the extension 40 to help hold the extension in place and to keep the extension from moving unless a positive force is applied to move it. The locking tab 72 extends downwardly into the slot 42 and accordingly prevents the extension from being inadvertently removed from the base 12 by cooperating with the slot to form a stop for the outward movement of extension 40.

The slot 60 which extends through the base 12 includes a counterbore portion 62 which extends upwardly from the bottom portion of the base 12. The counterbored portion 62 receives a portion of the head 54 of the bolt 50.

FIG. 3 is a bottom view of the apparatus of FIGS. 1 and 2. FIG. 3 clearly illustrates the generally trapezoidal configuration of the base 12 and the generally rectangular configuration of the extension or tongue 40 which is movably received in the groove 36 of the base 12. The generally parallel orientation of the front 14 and the back 20 of the base 12 is illustrated in FIG. 3, and also illustrated is the outwardly extending or sloping configuration of the sides 16 and 18 from the front 14 to the rear or back 20 of the base.

The trapezoidal configuration of the apparatus is advantageous with respect to the camera and to the use of the camera when the camera is secured to the base. The narrower front end and wider rear or back end allow for the accessibility and for the convenience of the user with respect to the various portions and adjustable features of the camera. For example, if the base 12 were of a generally rectangular or square configuration, the user of the camera would have a more difficult time adjusting the aperture ring, and other features at the front portion of the camera, than if the base were of a trapezoidal configuration, as with the present apparatus.

The base 12 includes a generally flat or planar bottom portion 24. Extension 40 also includes a generally flat or planar bottom portion 46. The groove 36 extends upwardly into the base 12 from the bottom portion 24. The extension or tongue 40 slides or moves in the groove 36 and is dimensioned so that the flat bottom 24 of the base 12 is substantially coextensive with the flat bottom portion 46 of the extension 40. The extension 40 is biased downwardly in the groove 36 by leaf spring 70, which is disposed in the base 12. The slot 42 in the extension 40 is shown in phantom in FIG. 3, and the locking tab 72 of the spring 70 is also shown in phantom extending into the slot 42.

The counterbored portion 62 of slot (see FIGS. 1 and 2) is shown in FIG. 3, with the head 54 of the bolt 50 disposed within the counterbored portion 62. The bolt 50 includes the internally threaded aperture 58, and a pair of diametrically opposed and radially extending slots 59 extend across the head 54 of the bolt and across the threaded aperture 58. The purpose of the slots 59 is, of course, to receive a blade, such as a blade of a screwdriver, to help secure the bolt 50 to a camera (see FIG. 2).

For convenience, the corners of the base 12 are illustrated as appropriately smoothly rounded to reduce potential damage problems with respect to the base, or to a user as may occur with sharper corners.

The extension 40 includes a relieved portion 44 which is substantially the width of the counterbored portion 62. The relieved portion 44, when the extension 40 is disposed within the base 12, is substantially coextensive with the counterbored portion 62 and accordingly allows access by the user of the apparatus to the head 54 of the bolt 50. The counterbored portion 62 is elongated similarly to the elongation of slot 60, and for the same general reason as is the slot 60.

FIG. 4 is a front view of the camera foot apparatus 10 of the present invention. In the front view as illustrated, is the front wall 14 and, sloping rearwardly from the front wall 14, are the side walls 16 and 18. The groove 36 is centrally located with respect to the front wall 14 and the sides of the groove extend both outwardly towards the sides and upwardly from the bottom 24 of the base 12. Accordingly, the top of the groove within the base 12 is wider than the bottom of the groove adjacent the bottom 24 of the base. The sides of the groove 36 are not perpendicular to the bottom 24 of the base 12. However, the sides of the groove do extend directly into the base and are generally perpendicular to the front 14 of the base (and also to the back or rear 20 of the base, as may be seen in FIG. 3).

The relative height or distance between the lower platform 26 and the upper platform 30 is clearly shown in FIG. 4. If desired, the distance between the bottom 24 and the lower platform 26 may be increased. Such increase may be desirable or necessary, for example, if it is desired to include another tongue or extension telescoping within the extension 40. In such case, it may be necessary to increase the thickness or height of the extension 40 and also the height or distance between the base 24 and the top of lower platform 26. The design of an additional (or more) telescoping member(s) may be preferably the same as shown with respect to base 12, extension 40, groove 36, and leaf spring 70 with its tab 72.

The intermediate wall 28 extends between the lower platform 26 and the upper platform 30, and the height of the wall, or the distance between the upper and lower platforms may be varied as desired. Similarly, the scope of the wall 28 may be as desired. In FIGS. 1 and 2 the wall is illustrated as sloping slightly rearwardly from the lower platform. Obviously, the wall may be oriented perpendicular to the platforms, which are preferably parallel to each other and to the bottom 24, or the wall may be oriented at any desired angle with respect to the platforms. The platforms are spaced apart from each other for accommodating lens barrels of various sizes, and the wall simply extends between the platforms.

Extending upwardly a short distance above the upper platform 30 is the stop 22. As illustrated, the width of the stop 22 may be somewhat less than the overall width of the rear or back portion of the base 12. Obviously, this is a matter of convenience with respect to the overall dimensions and configurations of the stabilizing foot apparatus 10.

On top of the upper platform 30 is the layer of cushion material 32 on which the camera is actually disposed (see FIG. 2). A portion of the threaded shank 52 of the bolt 50 is shown extending upwardly from the upper platform 30.

FIG. 5 is a bottom perspective view of the stabilizing foot apparatus 10 illustrating how the foot apparatus may be secured to a camera tripod 90. The camera tripod 90 includes a threaded shank 92 extending upwardly with respect to the tripod, and a knurled nut portion 94 connected to the threaded shank. The threaded shank 92 is received in the tapped or threaded aperture 58 of the bolt 50 which extends upwardly through the base 12. With the bolt 50 secured to a camera (see FIG. 2), the bolt 50 will be relatively fixed with respect to the base 12 and the stabilizing foot apparatus 10, and tripod 90 may accordingly be secured thereto by threading the shank 92 into the aperture 58 by rotating the knurled nut 94 secured to the shank 92.

With respect to the base 12, the stop 22 is shown in FIG. 5 as extending upwardly with respect to the cushion material 32 disposed on the upper platform of the base 12 (see FIGS. 1, 2 and 4). The juncture of the back or rear portion 20 and of the sides, such as side 18, is also illustrated as being smoothly curved, as discussed above. The bottom 24 of the base 12 is substantially coextensive or coplanar with the bottom portion 46 of the extension 40. The extension 40 includes the relieved portion 44 which receives the head 54 of the bolt 50.

The camera foot apparatus 10 illustrated in FIGS. 1–5, and discussed extensively in connection therewith, comprises effective and efficient apparatus for stabilizing a camera with an elongated or heavy lens attachment. The use of the stabilizing foot apparatus prevents the camera from resting on, or tipping on, such lens attachment. If desired, as discussed above and as illustrated, additional telescoping extensions may be included in substantially the same manner as the extension or tongue 40 shown with respect to the base 12.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Camera stabilizing foot apparatus, comprising in combination:

base means, including an upper platform and a lower platform extending outwardly from the upper platform;

a groove extending into the base means;

an extension movable in the groove adjacent the lower platform;

a recess disposed in the base means adjacent the groove;

a slot in the extension adjacent the recess in the housing means;

a spring disposed in the recess and biased against the extension to help hold the extension in place in the groove;

a tab on the spring extending into the slot to limit the movement of the extension relative to the base means; and means for fastening a camera to the upper platform.

2. The apparatus of claim 1 in which the base means further includes a stop at the upper platform remote from the lower platform.

3. The apparatus of claim 2 in which the means for fastening a camera to the upper platform comprises a bolt, and the base means further includes slot means extending through the base means for receiving the bolt.

4. The apparatus of claim 3 in which the slot means is elongated through the base means.

5. The apparatus of claim 4 in which the base means is of a generally trapezoidal configuration, with the upper platform generally wider than the lower platform.

* * * * *